(12) United States Patent
Verma et al.

(10) Patent No.: US 11,874,700 B2
(45) Date of Patent: Jan. 16, 2024

(54) WEARABLE SECURE DATA DEVICE (71) Applicant: International Business Machines Corporation, Armonk, NY (US)

(72) Inventors: Dinesh C. Verma, New Castle, NY (US); Bong Jun Ko, Harrington Park, NJ (US); Shahrokh Daijavad, Morgan Hill, CA (US); Nirmit V Desai, Yorktown Heights, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/680,762

(22) Filed: Nov. 12, 2019

(65) Prior Publication Data
US 2021/0141414 A1 May 13, 2021

(51) Int. Cl.
*G06F 21/60* (2013.01)
*G06F 1/16* (2006.01)
(Continued)

(52) U.S. Cl.
CPC .......... *G06F 1/163* (2013.01); *G06F 21/604* (2013.01); *G06F 21/64* (2013.01);
(Continued)

(58) Field of Classification Search
CPC ........ G06F 1/163; G06F 21/32; G06F 21/604; G06F 21/64; G06F 3/014; G06F 21/34; G06F 21/35; G06F 21/6218; G06F 21/31; G06F 21/445; G06F 21/602; G06F 21/6245; G06F 21/82; G06F 2221/2139;
(Continued)

(56) References Cited

U.S. PATENT DOCUMENTS

| 7,712,086 B2 | 5/2010 | Hughes et al. |
| 8,219,771 B2 | 7/2012 | Le Neel |

(Continued)

FOREIGN PATENT DOCUMENTS

| CN | 105430061 A | 3/2016 |
| CN | 106385678 A | 2/2017 |

(Continued)

OTHER PUBLICATIONS

Notification of Transmittal of the International Search Report and the Written Opinion of the International Searching Authority, or the Declaration, International Application No. PCT/IB2020/060523, dated Feb. 23, 2021, 12 pages.

(Continued)

*Primary Examiner* — Dionne Pendleton
(74) *Attorney, Agent, or Firm* — Donald J. O'Brien (57) ABSTRACT

Embodiments are disclosed for a method for a wearable secure data device. The method includes setting an operational mode for the wearable secure data device that stores a plurality of secure data items. The method also includes receiving a request for at least one of the secure data items from a client device that is communicating with a third-party device. Additionally, the method includes determining if the operational mode is associated with allowing access to the secure data items. Further, the method includes providing a response based on the determination.

16 Claims, 9 Drawing Sheets

(51) Int. Cl.
   *G07G 1/00*    (2006.01)
   *G06F 21/64*   (2013.01)
   *G07C 9/00*    (2020.01)
   *G07C 9/25*    (2020.01)
   *H04L 67/53*   (2022.01)

(52) U.S. Cl.
   CPC ......... *G07C 9/00309* (2013.01); *G07C 9/257* (2020.01); *G07G 1/0009* (2013.01); *H04L 67/53* (2022.05)

(58) Field of Classification Search
   CPC .... G06F 3/0416; G06F 9/44584; G06F 21/40; G06F 21/00; G06F 2221/2141; G06Q 20/321; G06Q 2220/10; G06Q 30/02; G07C 9/00309; G07C 9/00571; G07C 9/00912; G07C 9/257; G07C 2009/00769; G07C 9/00174; G07C 9/00563; G07C 9/28; G07C 9/27; G07G 1/0009; H04L 63/0861; H04L 63/083; H04L 63/0853; H04L 2209/805; H04L 2463/082; H04L 2463/121; H04L 63/0428; H04L 63/0492; H04L 63/062; H04L 63/0876; H04L 63/102; H04L 63/108; H04L 9/3226; H04L 9/3231; H04L 9/3234; H04L 12/28; H04L 63/08; H04L 63/107; H04L 63/18; H04L 67/535; H04L 63/10; H04L 63/101; G16H 10/65; G16H 40/63; G16H 40/67; H04B 1/385; H04B 10/116; H04B 5/0081; H04B 7/0408; H04B 7/15592; H04B 7/14; H04B 7/24; G06V 40/10; G08B 25/016; G08B 7/066; H04W 12/065; H04W 12/33; H04W 12/06; H04W 4/80; H04W 12/04; H04W 12/068; H04W 12/08; H04W 12/086; H04W 12/40; H04W 12/63; H04W 12/64; H04W 12/68; H04W 88/02; H04W 88/06; H04W 24/10; H04W 36/0005; H04W 36/08; H04W 36/30; H04W 40/22; H04W 76/14; H04W 88/085; H04W 12/069; H04W 4/02; H04W 4/023; H04W 4/029; H04W 76/10; H04W 74/04; H04W 84/08; H04W 84/12; H04Q 2209/43; H04M 1/67; H04M 1/72412; G06N 20/00; G06N 5/046
   See application file for complete search history.

(56) References Cited

U.S. PATENT DOCUMENTS

| | | | |
|---|---|---|---|
| 9,961,547 | B1* | 5/2018 | Molina-Markham ... H04M 1/67 |
| 9,984,216 | B2 | 5/2018 | Provkin |
| 10,075,846 | B1 | 9/2018 | Acar et al. |
| 11,210,363 | B1* | 12/2021 | Gao ..................... G06F 16/958 |
| 2005/0021679 | A1 | 1/2005 | Lightman et al. |
| 2014/0245396 | A1* | 8/2014 | Oberheide ............ G06F 21/40 726/4 |
| 2017/0124278 | A1 | 5/2017 | Gutekunst et al. |
| 2017/0357792 | A1 | 12/2017 | Itoh |
| 2018/0068105 | A1 | 3/2018 | Shapiro et al. |
| 2018/0103030 | A1* | 4/2018 | Einberg ................. G06F 1/163 |
| 2018/0302403 | A1* | 10/2018 | Souders ............. H04L 63/0861 |
| 2021/0226702 | A1* | 7/2021 | Kim ..................... H04B 10/116 |
| 2022/0124098 | A1* | 4/2022 | Shiralkar ............... H04L 63/20 |

FOREIGN PATENT DOCUMENTS

| | | |
|---|---|---|
| EP | 2229752 B1 | 5/2017 |
| WO | 2014165230 A1 | 10/2014 |
| WO | 2014202951 A1 | 12/2014 |
| WO | 2018109564 A1 | 6/2018 |
| WO | 2019088375 A1 | 5/2019 |
| WO | 2021094895 A1 | 5/2021 |

OTHER PUBLICATIONS

UK Examination Report Under 18(3), dated Jan. 5, 2023, Application No. GB2207639.2. (2 Pgs).

* cited by examiner

WEARABLE SECURE DATA DEVICE

BACKGROUND

The present disclosure relates to secure data, and more specifically, to a wearable secure data device.

Today, people exchange relatively large amounts of their data with various entities over the Internet, and much of this data is private or sensitive. However, the security of data on the Internet is often trusted to the security on a client device, e.g. a phone. Alternatively, the security of data can be trusted to a website that stores such data on their own servers.

SUMMARY

Embodiments are disclosed for a method for a wearable secure data device. The method includes setting an operational mode for the wearable secure data device that stores a plurality of secure data items. The method also includes receiving a request for at least one of the secure data items from a client device that is communicating with a third-party device. Additionally, the method includes determining if the operational mode is associated with allowing access to the secure data items. Further, the method includes providing a response based on the determination.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Because the security of private and/or sensitive data may be left to the client devices used to connect to the Internet, and the service providers on the Internet, vulnerabilities in such client devices and/or servers can lead to the exposure of this private and/or sensitive data. Private and/or sensitive data stored in the cloud may be vulnerable to attacks on the cloud. Further, trusting the data to be secured on a client device depends on the security of the client device. A client device can be a mobile computing device, such as a smart phone or tablet. However, client devices can be multifunctional, which can make these devices vulnerable to cyber attacks. Thus, it is challenging to provide reliable security mechanisms to protect private and/or sensitive data in the control of the user that are independent of the client device or the service provider.

Accordingly, some embodiments of the present disclosure can provide a wearable secure data device that is a wearable secure vault for private and/or sensitive data. The wearable secure data device can store and maintain an encrypted copy of private and/or sensitive data. Further, the wearer of the wearable secure data device can manually operate a sensor on the wearable secure data device, for example, to release private and/or sensitive data when the wearer determines that the private and/or sensitive data can be released securely. Additionally, the wearer can make specific selections of which data from the secure data is released.

Figure 1:
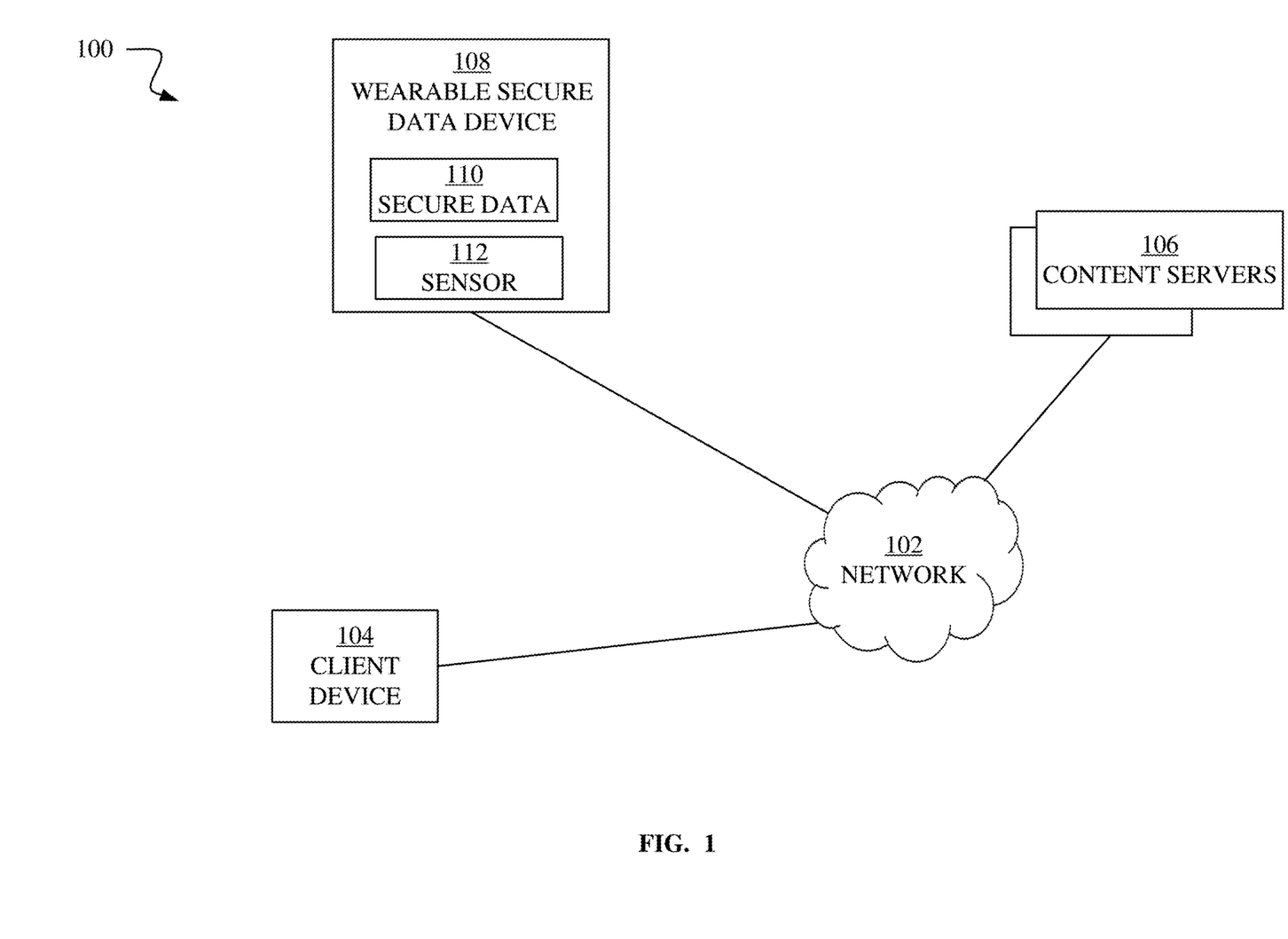
FIG. 1 is a block diagram of a system for securing data, in accordance with some embodiments of the present disclosure.

FIG. 1 is a block diagram of a system 100 for securing data, in accordance with some embodiments of the present disclosure. The system 100 may include a network 102, client device 104, content servers 106, and a wearable secure data device 108 hosting secure data 110. The network 102 may be one or more computer communication networks, including local area networks (LANS) and wide area networks (WANS). In some embodiments, the network 102 includes the Internet. The network 102 can enable communication between the client device 104, content servers 106, and wearable secure data device 108.

The client device 104 can be a computing device having a computer processor and memory, such as a laptop, tablet, smart watch, smart speaker, smartphone devices, and the like. The client device 104 can connect with the network 102 to access the content servers 106 over the Internet. The content servers 106 can include servers providing various services, including web servers, streaming video, chat, email, and the like.

As stated previously, the security of data can be trusted to the client device 104 and/or the content servers 106 that may handle personal data. In contrast, in some embodiments of the present disclosure, the wearable secure data device 108 may secure the secure data 110. The secure data 110 can include various types of personal and/or sensitive information including name, address, age, social security number, bank account numbers, credit card numbers, and the like. According to some embodiments of the present disclosure, the secure data 110 can be stored within a secure data storage device 108. For example, the secure data storage device 108 can store the secure data 110 with encryption.

Further, the wearable secure data device 108 can be a wearable computer that contains a processor (not shown), storage (not shown), a sensor (e.g., a security sensor) 112, and a network interface (not shown), for example. The sensor 112 can be a physical interface of the wearable secure data device 108 that can be used to change a security mode of the wearable secure data device 108. Examples of sensors 112 include, but are not limited to, a push-button, biometric scanner, touch sensor, switch, and microphone. In different modes, the wearable secure data device 108 can operate differently. For example, in a closed mode of operation, the wearable secure data device 108 may not reveal the secure data 110 to any other computing device, including the client device 104 and content servers 106. In contrast, during an open mode of operation, the wearable secure data device 108 can expose specific data from the secure data 110 to other devices. In accordance with some embodiments of the present disclosure, a physical operation of the sensor 112 can change operation modes between open and closed. For example, pressing a button of the sensor 112 can transition the wearable secure data device 108 from open mode to closed mode, and vice versa.

Further, the wearable secure data device 108 can pair with a computer application (app) running on the client device 104. In this way, the operation of the wearable secure data device 108 can be defined. The app can enable the owner of the secure data 110 to configure the behavior of the wearable secure data device 108 to allow some type of information (e.g., birthdate of spouse) to be revealed to predetermined types of websites (a banking or a travel websites). The app can also define and enforce permitted data releases for the wearable secure data device 108 when in open mode. More specifically, the app can define the types of personal information that can be collected from the wearable secure data device 108 as the wearable secure data device 108 examines communication from the client device 104 to other devices, such as the content servers 106.

According to some embodiments of the present disclosure, the wearable secure data device 108 can be a wearable item of clothing, jewelry, or accessory that includes a processor and secure data storage. The wearable secure data device 108 can store and maintain an encrypted copy of the secure data 110. Further, a simple operation on the wearable secure data device 108, such as a pushbutton or sensor, can enable the wearable secure data device 108 to release the secure data 110 to an application on the client device 104, or to an external entity such as a content server 106. In this way, the wearable secure data device 108 can provide control over the secure data 110 itself, and who gets access.

For example, the client device 104 may request a service, e.g., a streaming service for a popular movie, from a content server 106. However, as a condition of providing the service, the content server 106 may request information that is stored in the secure data 110, e.g., a form of payment. Accordingly, in response to a press of a button on the wearable secure data device 108, the wearable secure data device 108 can read and decrypt name, address, and a credit card number from the secure data 110. Further, the wearable secure data device 108 can provide the requested data to the streaming video content server, either directly, or indirectly (e.g., through the client device 104).

Figure 2:
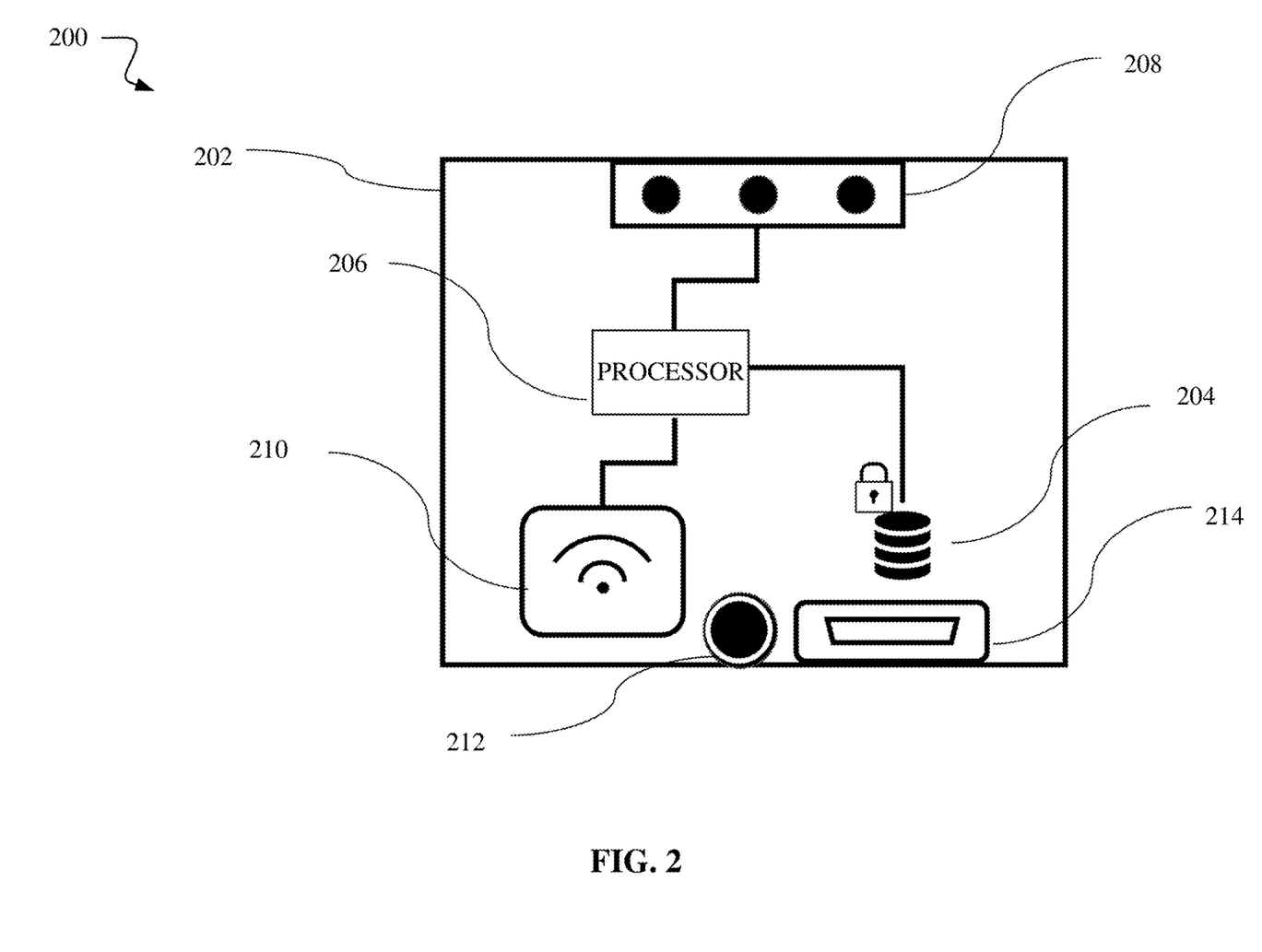
FIG. 2 is a block diagram of an example wearable secure data device, in accordance with some embodiments of the present disclosure.

FIG. 2 is a block diagram of an example wearable secure data device 200, in accordance with some embodiments of the present disclosure. The wearable secure data device 200 can be similar to the wearable secure data device 108 described with respect to FIG. 1. Referring back to FIG. 2, the wearable secure data device 200 can be a secure data vault that is portable and small enough to be wearable. The wearable secure data device 200 includes a housing 202 for a flash drive 204, processor 206, security sensor 208, network interface 210, battery 212, and connector 214. The flash drive 204 can be an electronic data storage device with no moving parts. The flash drive 204 can be, for example, an integrated circuit memory chip. According to some embodiments of the present disclosure, the flash drive 204 can store encrypted data. The processor 206 can be a computer processing circuit configured to perform the techniques described herein. More specifically, the processor 206 can run software to encrypt and decrypt the data on the flash drive 204. The security sensor 208 can be an operable, physical interface that sends configuration control requests to the processor 206 to change the mode of operation. The network interface 210 can be a wireless computer communications network interface. According to some embodiments of the present disclosure, the network interface 210 can enable communication between the wearable secure data device 200 and an external client device such as, the client device 104 described with respect to FIG. 1.

Referring back to FIG. 2, the battery 212 can be coupled with the flash drive 204, processor 206, sensor 208, and network interface 210. Further, the battery 212 can be charged by an external power source through the connector 214. The external power source could be a power outlet or photoelectric charging panel, for example, wired to the connector 214, e.g., a micro-USB port. Accordingly, the flash drive 204, processor 206, security sensor 208, network interface 210, battery 212, and connector 214 can be arranged within and upon the housing 202, and interconnected electrically. Further, the housing 202 can thus be incorporated into a wearable item, such as a ring, watch, bracelet, glove, and the like, thus making it possible for a user that owns the secure data 110 (described with respect to FIG. 1) to wear the wearable secure data device 200. In this way, the wearable secure data device 200 can give such users physical control over the security of their secure data 110.

According to some embodiments of the present disclosure, the security sensor 208 can be a finger-print scanner that scans the fingerprint of a validated user to put the wearable secure data device 200 into different modes of operation. In the closed mode, the wearable secure data device 200 can secure the secure data 110 by not allowing access to the secure data 110. In other words, requests for the secure data 110 are rejected. In contrast, in the open mode of operation, the wearable secure data device 200 can allow the secure data 110 to be read according to predetermined access control policies. Alternatively, or additionally, the security sensor 208 can include a touch sensor that triggers a change to the mode of operation in response to a predetermined number of touches to the security sensor 208. Alternatively, or additionally, the security sensor 208 can be a physical switch that can be moved into different positions for different modes. Alternatively, or additionally, the security sensor 208 can include small jumper switches that can be configured into multiple possible combinations for operation modes. Alternatively, or additionally, the security sensor 208 can be an audio microphone that can trigger different operation modes in response to predetermined spoken commands.

In some embodiments, the secure data 110 can be categorized based on types of data, and a level of privacy and/or sensitivity. Accordingly, in such embodiments, the control of the types and level of the data to be released, according to different operation modes, can be enforced through physical separation. For example, the locations in the flash drive 204 where different types and levels of data are stored can be physically separate. Additionally, the communication circuits on which the different types and levels of data is read and written can be physically separate. According to some embodiments of the present disclosure, the control can be implemented by electrical and digital means, in which digital logic circuits and gates are used to enforce the policies under which the secure data 110 can be released.

Figure 3:
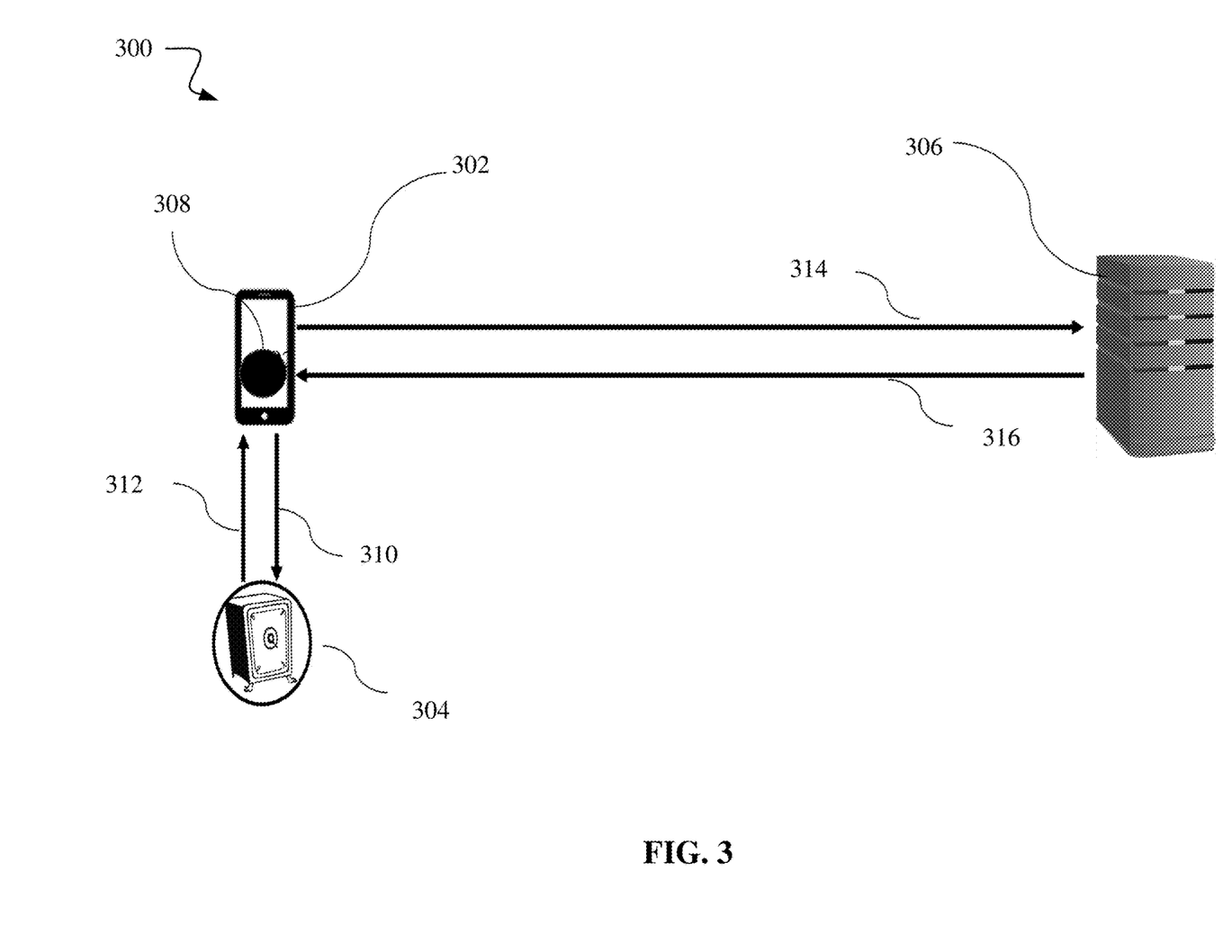
FIG. 3 is a block diagram of a network proxy system, in accordance with some embodiments of the present disclosure.

FIG. 3 is a block diagram of a client device add-on system 300, in accordance with some embodiments of the present disclosure. The client device add-on system 300 can include a client device 302, wearable secure data device 304, and network router 306. The client device 302, wearable secure data device 304, and network router 306 can be similar to the client device 402, wearable secure data device 404, and network router 406 described with respect to FIG. 4.

Referring back to FIG. 3, in the client device add-on system 300, the client device 302 can include a computer application (app) 308, such as a driver or a software development kit. The app 308 can make a request 310 to the wearable secure data device 304 for secure data 110. The wearable secure data device 304 can be paired with the client device 302 such that the wearable secure data device 304 can provide, in response to the request 310, a response 312. In an open mode of operation, the wearable secure data device 304 can include the requested information from the secure data 110 (described with respect to FIG. 1). In a closed mode of operation, the wearable secure data device can provide a closed response, e.g., providing the response 312, but with blanked or zeroed-out values in place of the requested secure data. Alternatively, in the closed mode of operation, the wearable secure data device 304 may not generate the response 312. Accordingly, the client device 302 can generate a request 314 to a content server 106 (described with respect to FIG. 1), for example, without secure data 110 from the wearable secure data device 304. The client device 302 can send the request 314 for the content server 106 using the network router 306. Additionally, the content server 106 can generate a response 316 to the network router 306, and the network router 306 can provide the response 316 to the client device 302.

Because the wearable secure data device 304 is used as a client device add-on and not a network proxy, the wearable secure data device 304 cannot modify requests to external servers, such as, the content servers 106. However, the wearable secure data device 304 can ensure that the request 314 does not include secure data 110 stored in the wearable secure data device 304. Further, as a client device add-on, the wearable secure data device 304 cannot modify the response 316 from the content server 106. Thus, in the client device add-on system 300, the wearable secure data device 304 can merely secure the privacy of the secure data 110, and not the client device 302.

Figure 4:
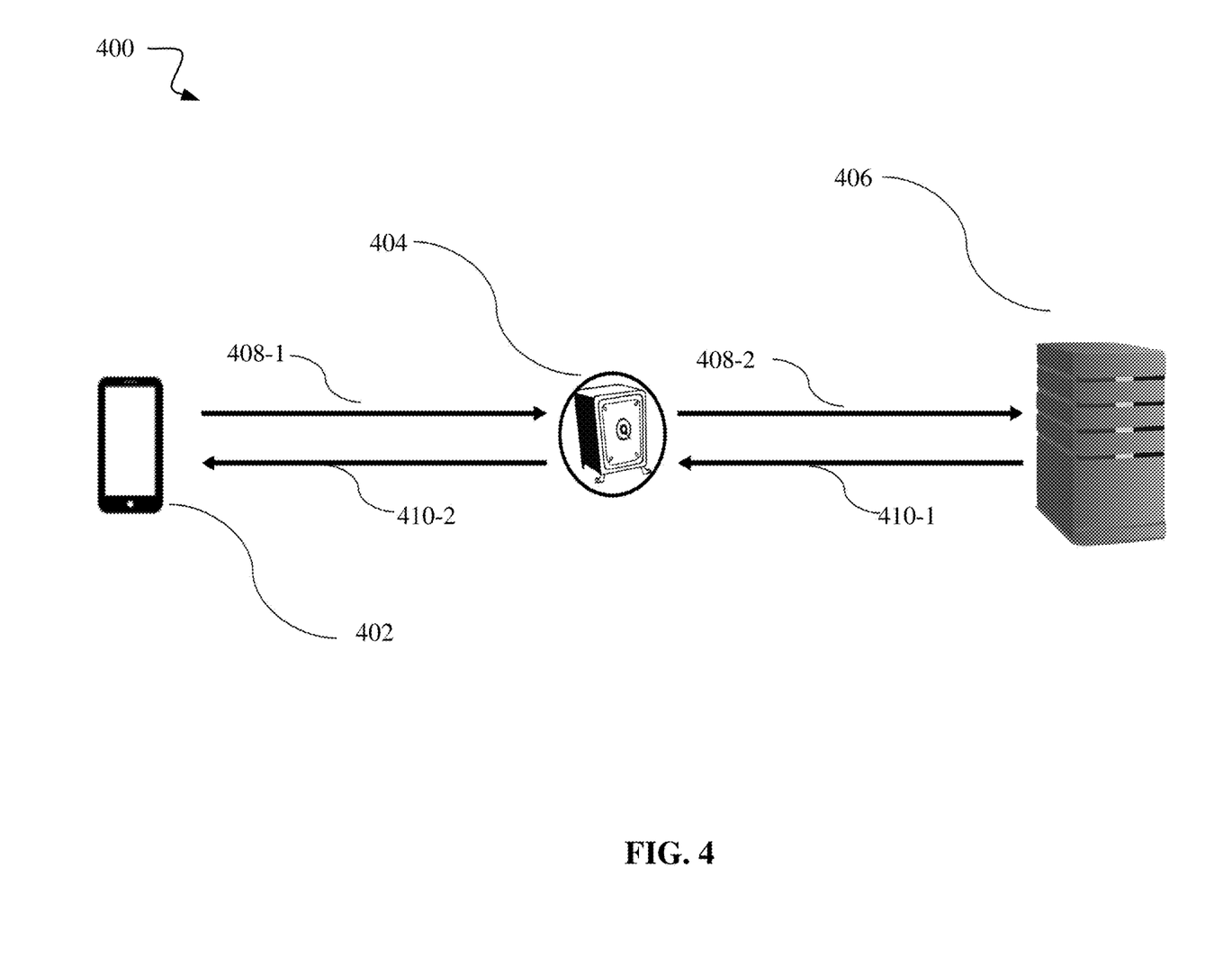
FIG. 4 is a block diagram of a client device add-on system, in accordance with some embodiments of the present disclosure.

FIG. 4 is a block diagram of a network proxy system 400, in accordance with some embodiments of the present disclosure. The network proxy system 400 can include a client device 402, wearable secure data device 404, and network router 406. The client device 402 and wearable secure data device 404 can be similar to the client device 104 described with respect to FIG. 1. The wearable secure data device 404 can be similar to the wearable secure data device 108 described with respect to FIG. 1 and the wearable secure data device 200 described with respect to FIG. 2. Referring back to FIG. 4, the network router 406 can be a computer communication device that physically routes data packets to a network. Thus, the client device 402 and wearable secure data device 404 can connect to the Internet, for example through the network router 406.

According to some embodiments of the present disclosure, the client device 402 can be used with the wearable secure data device 404 in one of two network topologies: a network proxy and a client device add-on. In the network proxy system 400, the wearable secure data device 404 uses its network interface to become a proxy for the client device 402. In other words, the wearable secure data device 404 can act like a wi-fi access point for the client device 402, enabling the client device 402 to connect through the wearable secure data device 404 to the Internet. In this way, the wearable secure data device 404 can intercept a request 408-1 from the client device 402. Further, the wearable secure data device 404 can modify the request 408-1, e.g., replace personally identifiable information in the request 408-1 with some other type of information. Alternatively, or additionally, the wearable secure data device 404 can add some additional information. Accordingly, the wearable secure data device 404 can forward a modified request 408-2 with the alternative and/or additional data. Similarly, the wearable secure data device 404 can intercept a response 410-1 coming over the network router 406. In some scenarios, some websites, for example, can put tracking markers within the response 410-1. These tracking markers can track activities of the client device 402. In some cases, the tracking markers can include an image to download, or a cookie that identifies the client device 402 on repeated interactions. The wearable secure data device 404 can remove such markers, so that the privacy of the individual is better preserved. The wearable secure data device 404 can thus modify the response 410-1 coming from a website, for example, and generate a modified response 410-2. Further, the wearable secure data device 404 can send the modified response 410-2 to the client device 402. Thus, in the network proxy system 400, the wearable secure data device 404 can secure the privacy of the secure data 110 and the client device 402.

Figure 5:
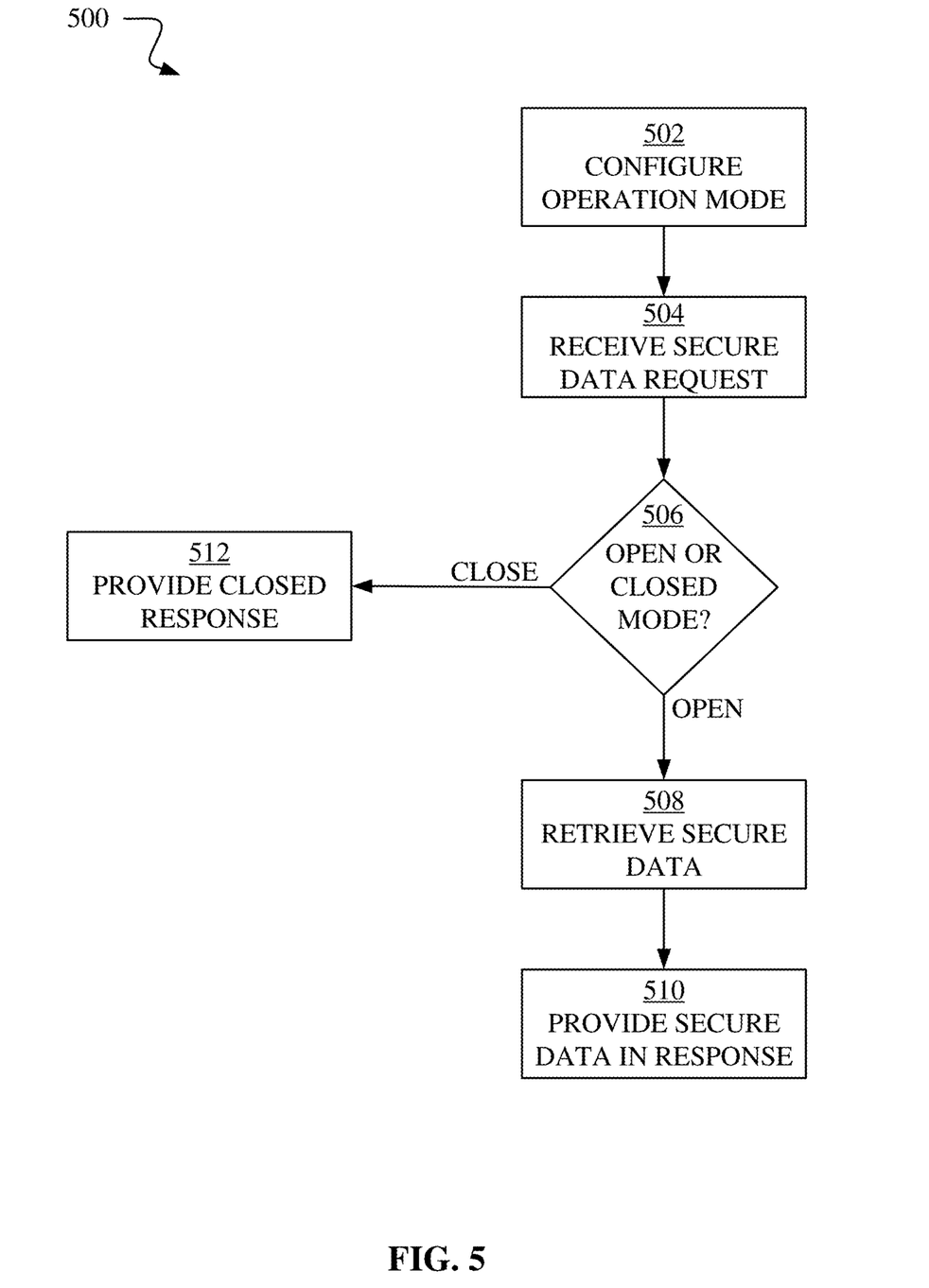
FIG. 5 is a process flow diagram of a method for a wearable secure data device, in accordance with some embodiments of the present disclosure.

FIG. 5 is a process flow diagram of a method 500 for a wearable secure data device, in accordance with some embodiments of the present disclosure. The method 500 can be performed by a wearable secure data device, such as the wearable secure data device 108 described with respect to FIG. 1.

Referring back to FIG. 5, at operation 502, the wearable secure data device 108 can configure the operation mode. In some embodiments of the present disclosure, the operation mode can be configured to an open mode, within which secure data can be released. Alternatively, the operation mode can be configured to a closed mode, within which secure data is not released. The wearable secure data device 108 can configure the operation mode in response to inputs detected by a security sensor, such as the sensor 112.

At operation 504, the wearable secure data device 108 can receive an access request for information from the secure data 110. The request may be received from a client device, such as the client device 104. In a network proxy system, the request may include a request from the client device to a content server, such as the content servers 106. In a client device add-on system, the request may simply be a request for secure data 110.

At operation 506, the wearable secure data device 108 can determine whether the operation mode is open or close. If the operation mode is open, control may flow to operation 508. If the operation mode is close, control may flow to operation 512.

At operation 508, the wearable secure data device 108 can retrieve the requested information from the secure storage of the wearable secure data device 108, such as the flash drive 204 described with respect to FIG. 2. Referring back to FIG.

5, the wearable secure data device 108 can also decrypt the data read from the flash drive 204 in operation 508.

At operation 510, the wearable secure data device 108 can provide the secure data in a response. The wearable secure data device 108 can package the decrypted data in a response, and provide the response based on the network system. In a network proxy system, the wearable secure data device 108 can augment the original request from the client device 104 with the requested secure data 110 and forward the request to the content server 106. In a client device add-on system, the wearable secure data device 108 can send the requested secure data 110 in a response to the client device 104.

As stated previously, if the operation mode is closed, control flows to operation 512. At operation 512, the wearable secure data device 108 can provide a closed response for the original request. In closed mode, the wearable secure data device 108 may not release the secure data 110.

Accordingly, in a network proxy system, the wearable secure data device 108 can generate a modified request from the client device 104 to the content servers 106. The modified request can include blank or null fields in place of the requested secure data. Additionally, the wearable secure data device 108 can send the modified request to the content servers 106. In a client device add-on system, the wearable secure data device 108 can provide a closed response to the client device 104. Alternatively, the wearable secure data device 108 may not respond to the request for the secure data 110.

Figure 6A:
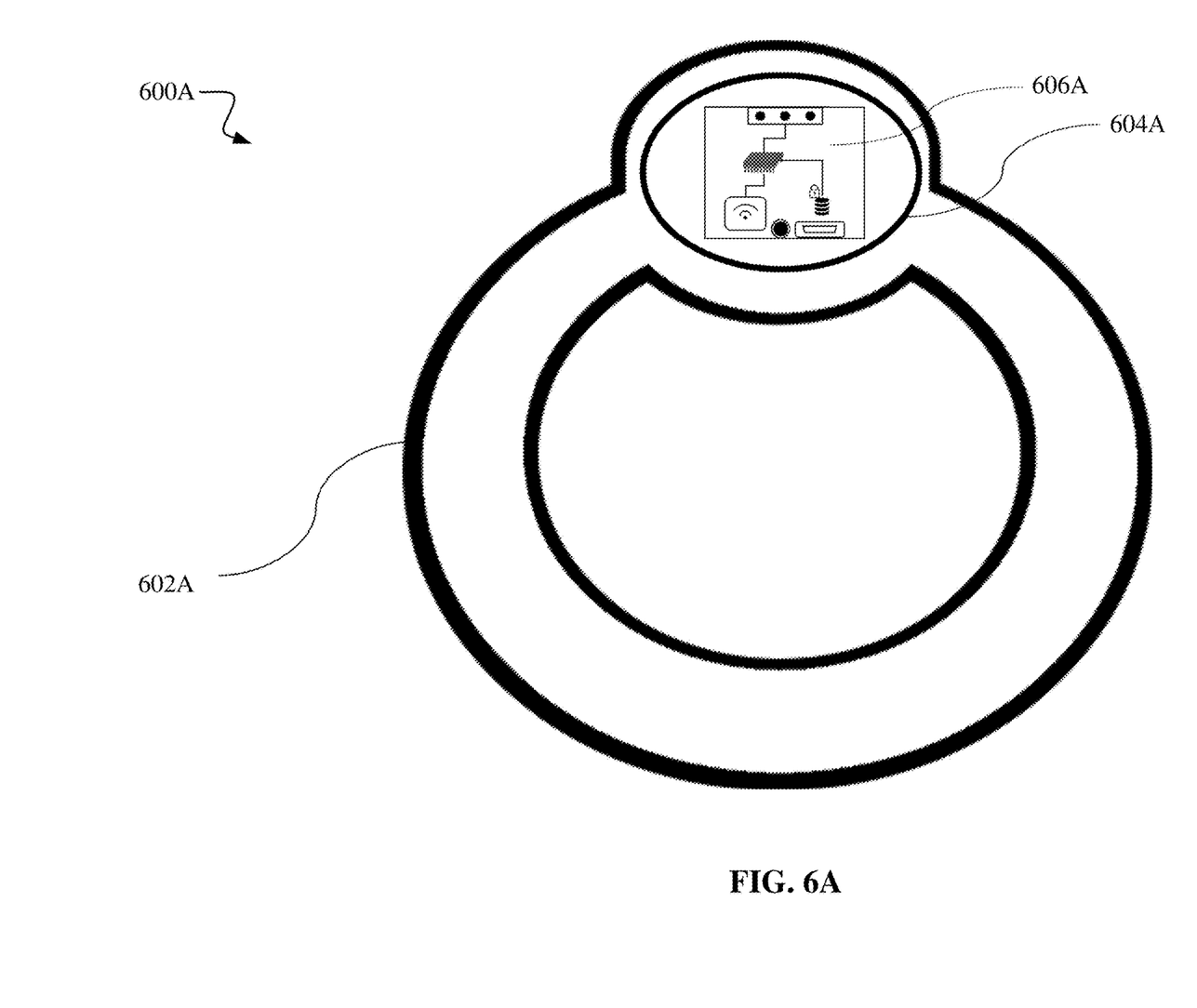
FIGS. 6A-6C are block diagrams of example wearable secure data devices, in accordance with some embodiments of the present disclosure.

FIG. 6A is a block diagram of an example wearable secure data device 600A, in accordance with some embodiments of the present disclosure. As stated previously, the structure of a wearable secure data device, such as the wearable secure data device 600A, can vary. The example wearable secure data device 600A includes a housing 602A that includes a finger ring with a holder 604A that can be worn by men, women, and/or children. The holder 604A may be similar to a structure for holding gems or insignia on a ring. In such an embodiment, the holder 604A can include a system on a chip (SOC) 606A. The system on a chip 606A can include a flash drive, processor, sensor, network interface, battery, and connection, such as the flash drive 204, processor 206, sensor 208, network interface 210, battery 212, and connector 214, described with respect to FIG. 2. In some embodiments, the wearable secure data device 600A can include a gem stone or other decoration on the holder 604A above the SOC 606A. In some embodiments, the connector 214 can be configured within the gem stone.

As stated previously, the data owner can put the wearable secure data device 600A into an operation mode (open or close) by using the security sensor, e.g. by tapping the touch sensor a number of times. Additionally, the wearable secure data device 600A can include one or more light emitting diode (LED) lights that illuminate to indicate the mode of operation visually. Thus, each potential color of the LED lights can represent a different operational mode. In other embodiments, the operation mode of the wearable secure data device 600A can be displayed and controlled on the app running on the client device 104, where the status and control command of the operation mode is communicated between the wearable secure data device 600A and the client device 104 through an isolated, secure control communication channel separated either physically or logically from the communication methods used to release the secure data 110.

Figure 6B:
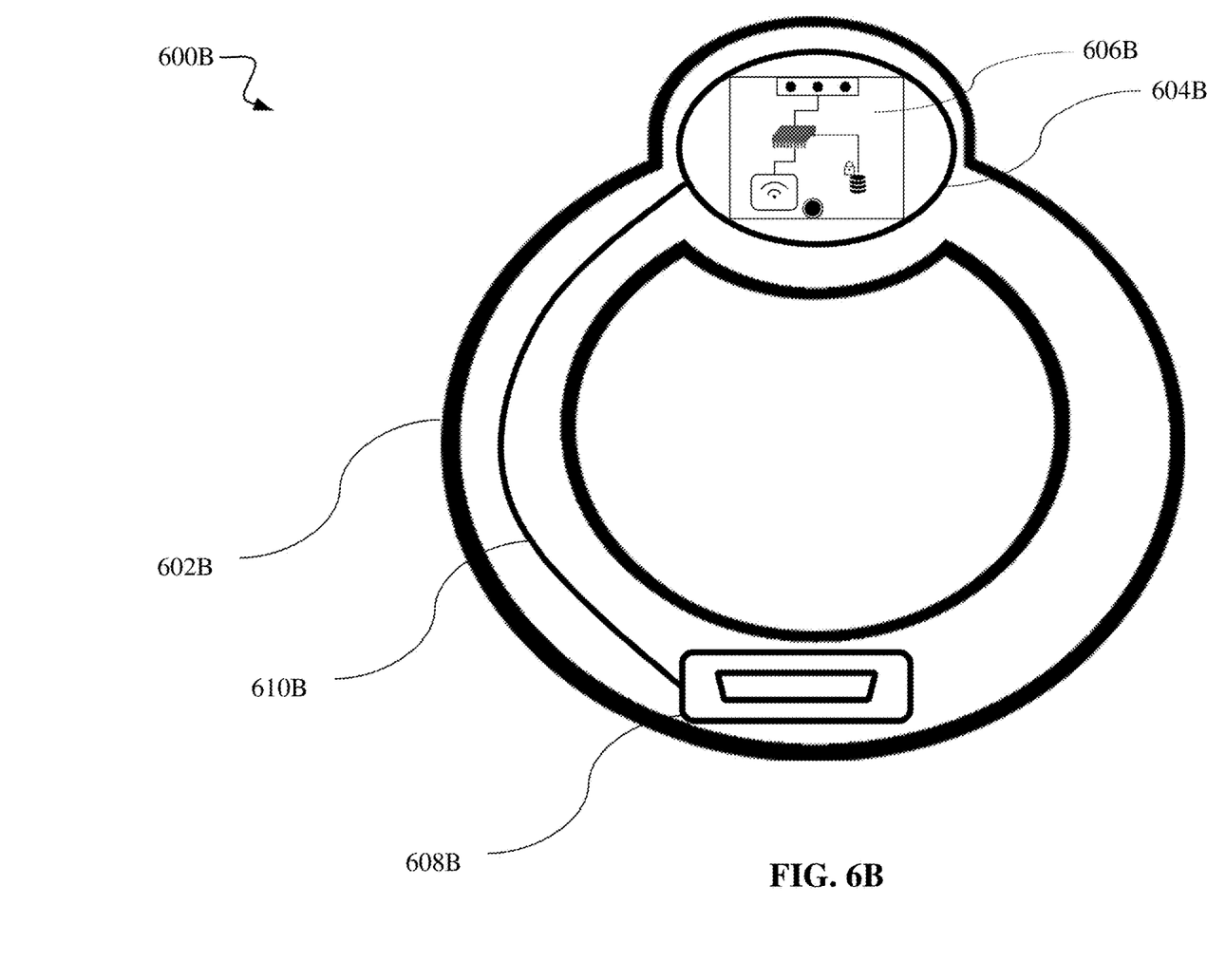

FIG. 6B is a block diagram of an example wearable secure data device 600B, in accordance with some embodiments of the present disclosure. The example wearable secure data device 600B, can be similar to the example wearable secure data device 600A, but with a different configuration. For example, the example wearable secure data device 600B includes a ring housing 602B, and a holder 604B that can be used for holding gems or insignia on a ring. In such an embodiment, the holder 604B can include a system on a chip (SOC) 606B. The system on a chip 606B can include the flash drive 204, processor 206, sensor 208, network interface 210, and battery 212. However, instead of placing the connector 214 on the SOC 606B, the ring housing 602B is configured with a connection 608B. Accordingly, the ring housing 602B can include an electrical connection 610B that provides power to the battery of the SOC 606B.

Figure 6C:
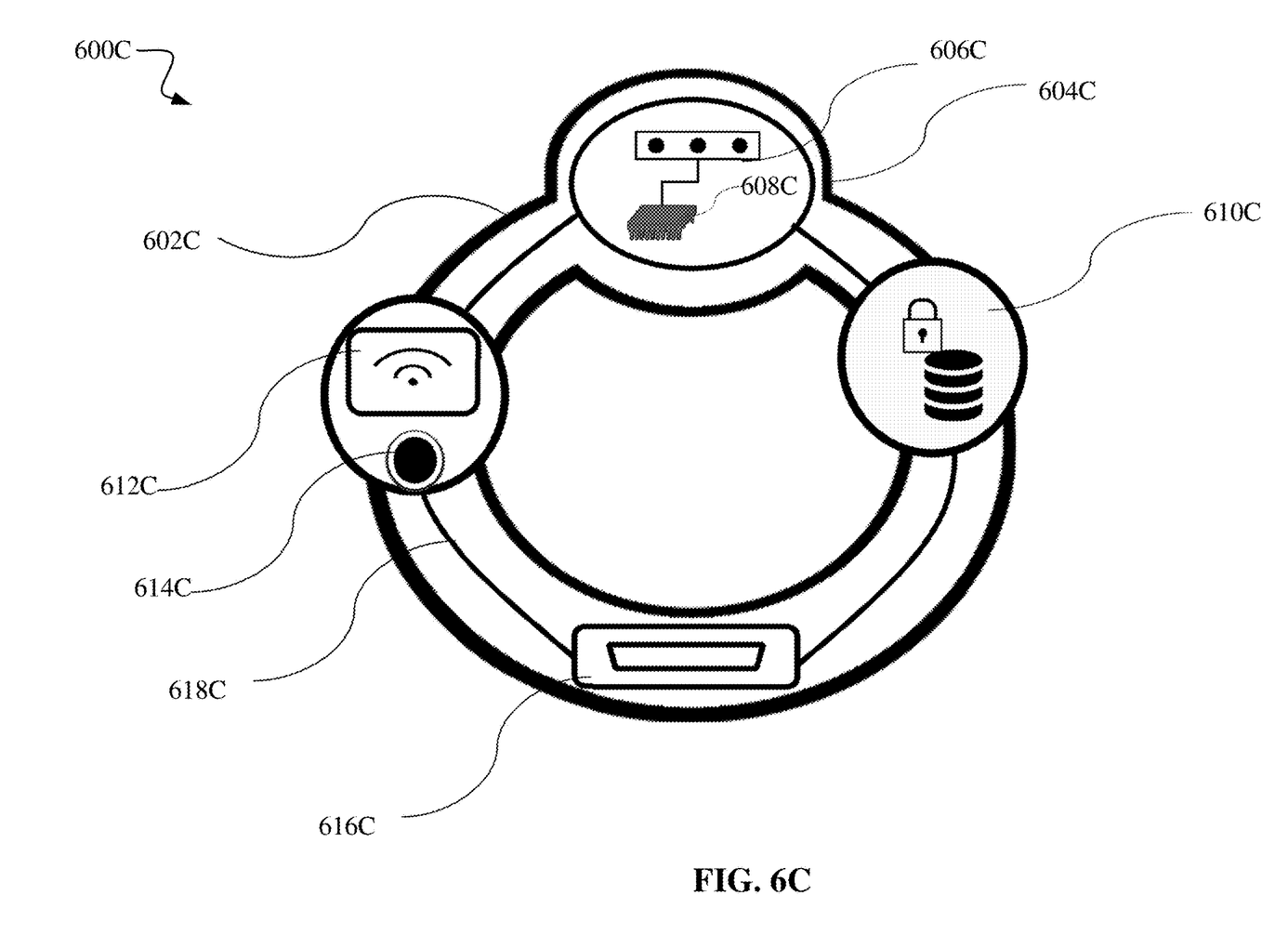

FIG. 6C is a block diagram of an example wearable secure data device 600C, in accordance with some embodiments of the present disclosure. The example wearable secure data device 600C, can be similar to the example wearable secure data devices 600A and 600B, but with a different configuration. In the example wearable secure data device 600C, the same set of components from the example wearable secure data devices 600A, 600B, may be distributed at other locations along the ring housing 602C.

For example, the example wearable secure data device 600C includes a ring housing 602C, and a holder 604C that can be used for holding gems or insignia on a ring. In such an embodiment, the holder 604C can include a sensor 606C and a processor 608C. Further, the housing 602C can also include a flash drive 610C, network interface 612C, battery 614C, and connection 616C. Additionally, the ring housing 602C can include an electrical connection 618C that conducts power from the connection 616C to the battery 614C, and from the battery to the other electrical components of the wearable secure data device 600C.

Figure 7:
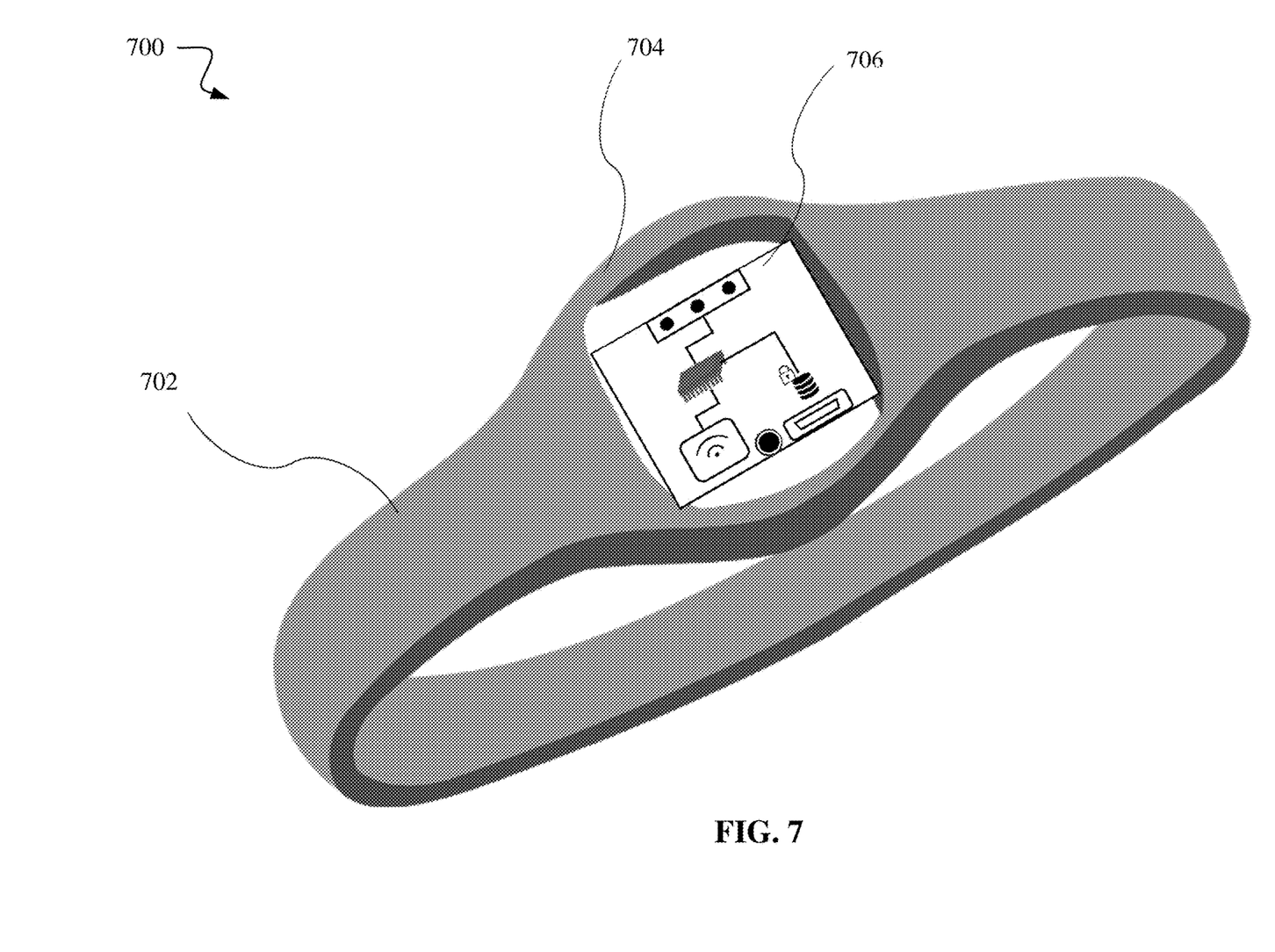
FIG. 7 is a block diagram of an example wearable secure data device, in accordance with some embodiments of the present disclosure.

FIG. 7 is a block diagram of an example wearable secure data device 700, in accordance with some embodiments of the present disclosure. As stated previously, the structure of a wearable secure data device, such as the wearable secure data device 700, can vary. For example, the wearable secure data device 700 has a watchband housing 702 with a holder 704. The holder 704 may be similar to a structure for holding a watch face in the watchband housing 702. In such an embodiment, the holder 704 can include a SOC 706, which can include the flash drive 204, processor 206, sensor 208, network interface 210, battery 212, and connector 214, described with respect to FIG. 2.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system comprising:
a communication interface;
a security sensor;
a computer processing circuit;
a portable housing that encloses at least portions of the communication interface, the security sensor, and the computer processing circuit; and
a computer-readable storage medium storing instructions, which, when executed by the computer processing circuit, are configured to cause the computer processing circuit to perform a method comprising:
changing an operational mode from a closed operational mode to an open operational mode for a secure data device that stores a plurality of secure data items, in response to a manual user input detected by the security sensor;
receiving a request for at least one of the secure data items from a client device that is communicating with a third-party device;
providing a response to the request for the at least one secure data item based on the operational mode, wherein providing the response to the request comprises providing the response directly to the third-party device, and wherein:

the response comprises at least one of the secure data items for the open operational mode;
the response comprises a blank response for the closed operational mode; and
providing the response comprises:
retrieving the at least one secure data item from a secure storage of the secure data device;
decrypting the at least one secure data item; and
generating the response comprising the at least one secure data item.

2. The system of claim 1, further comprising illuminating the secure data device based on the operational mode.

3. The system of claim 1, wherein the request for the at least one secure data item comprises a request from the client device to the third-party device.

4. The system of claim 3, wherein providing the response comprises modifying the request from the client device such that the request comprises the at least one secure data item.

5. The system of claim 1, wherein the security sensor is selected from a group comprising a touch sensor, push button, biometric sensor, switch, and microphone.

6. A computer program product comprising program instructions stored on a computer readable storage medium, wherein the computer readable storage medium is not a transitory signal per se, the program instructions executable by a processor to cause the processor to perform a method comprising:
changing an operational mode from a closed operational mode to an open operational mode for a secure data device that stores a plurality of secure data items, in response to a manual user input detected by a security sensor;
receiving a request for at least one of the secure data items from a client device that is communicating with a third-party device;
providing a response to the request for the at least one secure data item based on the open operational mode, wherein providing the response to the request comprises providing the response directly to the third-party device, and wherein:
the response comprises at least one of the secure data items for the open operational mode;
the response comprises a blank response for the closed operational mode; and
providing the response comprises:
retrieving the at least one secure data item from a secure storage of the secure data device;
decrypting the at least one secure data item; and
generating the response comprising the at least one secure data item.

7. The computer program product of claim 6, wherein:
the operational mode is not associated with allowing access to the secure data items; and
providing the response comprises generating a closed response that does not comprise the at least one secure data item.

8. The computer program product of claim 6, the method further comprising illuminating the secure data device based on the open operational mode.

9. The computer program product of claim 6, wherein the request for the at least one secure data item comprises a request from the client device to the third-party device.

10. The computer program product of claim 9, wherein providing the response comprises modifying the request from the client device such that the request comprises the at least one secure data item.

11. A computer-implemented method, comprising:
changing an operational mode from a closed operational mode to an open operational mode for a secure data device that stores a plurality of secure data items, in response to a manual user input detected by a security sensor;
receiving a request for at least one of the secure data items from a client device that is communicating with a third-party device; and
providing a response to the request for the at least one secure data item, wherein the response comprises at least one of the secure data items for the open operational mode, and wherein the response comprises a blank response for the closed operational mode, wherein providing the response to the request comprises providing the response directly to the third-party device.

12. The method of claim 11, wherein:
the open operational mode is associated with allowing access to the secure data items; and
providing the response comprises:
retrieving the at least one secure data item from a secure storage of the secure data device;
decrypting the at least one secure data item; and
generating the response comprising the at least one secure data item.

13. The method of claim 11, wherein:
the operational mode is not associated with allowing access to the secure data items; and
providing the response comprises generating a closed response that does not comprise the at least one secure data item.

14. The method of claim 11, further comprising illuminating the secure data device based on the operational mode.

15. The method of claim 11, wherein the request for the at least one secure data item comprises a request from the client device to the third-party device.

16. The method of claim 15, wherein providing the response comprises modifying the request from the client device such that the request comprises the at least one secure data item.

* * * * *